(12) United States Patent
Patil et al.

(10) Patent No.: US 9,392,525 B2
(45) Date of Patent: Jul. 12, 2016

(54) ESTABLISHING RELIABLE ROUTES WITHOUT EXPENSIVE MESH PEERING

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US); Alireza Raissinia, Monte Sereno, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 14/279,612

(22) Filed: May 16, 2014

(65) Prior Publication Data

US 2015/0334631 A1    Nov. 19, 2015

(51) Int. Cl.

| | |
|---|---|
| H04W 40/28 | (2009.01) |
| H04W 12/04 | (2009.01) |
| H04L 9/30 | (2006.01) |
| H04L 29/06 | (2006.01) |
| H04L 12/751 | (2013.01) |
| H04L 12/721 | (2013.01) |
| H04L 12/703 | (2013.01) |
| H04W 84/18 | (2009.01) |

(52) U.S. Cl.
CPC ............... *H04W 40/28* (2013.01); *H04L 9/30* (2013.01); *H04L 45/02* (2013.01); *H04L 45/026* (2013.01); *H04L 45/26* (2013.01); *H04L 45/28* (2013.01); *H04L 63/0869* (2013.01); *H04W 12/04* (2013.01); *H04L 2209/24* (2013.01); *H04L 2209/80* (2013.01); *H04W 84/18* (2013.01)

(58) Field of Classification Search
CPC ..... H04W 40/28; H04W 12/04; H04W 84/18; H04L 9/30; H04L 2209/24; H04L 2209/80
See application file for complete search history.

(56) References Cited

U.S. PATENT DOCUMENTS

| | | | |
|---|---|---|---|
| 8,351,896 B2 | 1/2013 | Purnadi et al. | |
| 8,447,875 B2 * | 5/2013 | Liu ....................... | H04L 45/125 370/312 |

(Continued)

OTHER PUBLICATIONS

ISA/EPO, International Search Report and Written Opinion of the International Searching Authority, Int'l App. No. PCT/US2015/025045, Jun. 22, 2015, European Patent Office, Rijswijk, NL, 11 pgs.

(Continued)

*Primary Examiner* — Joseph P Hirl
*Assistant Examiner* — Stephen Gundry
(74) *Attorney, Agent, or Firm* — Holland & Hart LLP

(57) ABSTRACT

A device may join an existing mesh network by authenticating with only one of a plurality of member devices of the existing mesh network. Once the device has successfully authenticated with the only one member device, the device may receive a common group key. The device may send a route request message encrypted with the common key to one or more of the plurality of member devices of the existing mesh network. In response, the device may receive one or more route reply messages encrypted with the common key from one or more of the plurality of member devices of the existing mesh network. The device may determine an optimal route to one or more provider member devices of the existing mesh network based on the received route reply messages.

35 Claims, 9 Drawing Sheets

(56) References Cited

U.S. PATENT DOCUMENTS

| | | | |
|---|---|---|---|
| 8,516,256 | B2 | 8/2013 | Vogt et al. |
| 8,982,908 | B1 | 3/2015 | Shukla et al. |
| 2005/0152305 | A1 | 7/2005 | Ji et al. |
| 2005/0243765 | A1* | 11/2005 | Schrader .............. H04L 12/24 370/328 |
| 2006/0285529 | A1* | 12/2006 | Hares .................. H04L 45/16 370/338 |
| 2007/0025309 | A1 | 2/2007 | Yano et al. |
| 2007/0110024 | A1* | 5/2007 | Meier .................. H04L 45/04 370/351 |
| 2007/0177511 | A1 | 8/2007 | Das et al. |
| 2007/0206537 | A1* | 9/2007 | Cam-Winget ........ H04L 63/162 370/331 |
| 2007/0260878 | A1 | 11/2007 | Urivskiy et al. |
| 2008/0065884 | A1* | 3/2008 | Emeott ................ H04L 9/0836 713/168 |
| 2008/0095059 | A1 | 4/2008 | Chu |
| 2009/0073943 | A1* | 3/2009 | Krishnaswamy ..... H04W 88/04 370/338 |
| 2009/0164663 | A1* | 6/2009 | Ransom ................ H04L 45/00 709/243 |
| 2009/0252134 | A1 | 10/2009 | Schlicht et al. |
| 2009/0274173 | A1* | 11/2009 | Wentink ............... H04L 69/22 370/474 |
| 2010/0061272 | A1 | 3/2010 | Veillette |
| 2010/0074194 | A1 | 3/2010 | Liu et al. |
| 2010/0142421 | A1 | 6/2010 | Schlicht et al. |
| 2010/0172249 | A1 | 7/2010 | Liu |
| 2010/0322141 | A1 | 12/2010 | Liu et al. |
| 2011/0131411 | A1* | 6/2011 | Lin .................... H04L 12/4633 713/168 |
| 2012/0044949 | A1 | 2/2012 | Velev et al. |
| 2012/0066492 | A1* | 3/2012 | Gamer ................. H04L 45/00 713/156 |
| 2013/0042313 | A1* | 2/2013 | Lambert ............... H04W 12/04 726/7 |
| 2013/0051250 | A1* | 2/2013 | Shaffer ................. H04L 45/22 370/252 |
| 2013/0265909 | A1* | 10/2013 | Park .................... H04L 45/26 370/255 |
| 2013/0283347 | A1* | 10/2013 | Hui .................... H04L 67/12 726/3 |
| 2013/0283360 | A1* | 10/2013 | Hui .................... H04L 63/08 726/6 |
| 2013/0294230 | A1* | 11/2013 | Popa .................. H04W 28/08 370/230 |
| 2013/0294284 | A1* | 11/2013 | Popa .................. H04L 63/065 370/254 |
| 2014/0003295 | A1 | 1/2014 | Gossain et al. |
| 2014/0056129 | A1 | 2/2014 | Wen et al. |
| 2015/0092606 | A1 | 4/2015 | Kelsey et al. |
| 2015/0264627 | A1 | 9/2015 | Perdomo |
| 2015/0334629 | A1 | 11/2015 | Patil et al. |

OTHER PUBLICATIONS

Islam et al., "A Secure Hybrid Wireless Mesh Protocol for 802.11s Mesh Network", Computational Science and Its Applications—ICCSA 2008, Lecture Notes in Computer Science, Jun. 30, 2008, pp. 972-985, URL: http://www.researchgate.net/publication/225436073_A_Secure_Hybrid_Wireless_Mesh_Protocol_for_802.11s_Mesh_Network, XP019091476, ISBN: 978-3-540-69838-8, Springer-Verlag Berlin Heidelberg.

Avula et al., "Secure Hybrid Wireless Mesh Protocol (SHWMP)," Mobile Ad Hoc Networks, Internet Draft, <draft-rfc-editor-shwmp-00.txt>, Feb. 4, 2014, pp. 1-14, Internet Engineering Task Force (IETF), http://datatracker.ietf.org.

Bahr, "Update on Hybrid Wireless Mesh Protocol of IEEE 802.11s," IEEE International Conference on Mobile Adhoc and Sensor Systems, 2007 (MASS 2007), Pisa, Oct. 8-11, 2007, 6 pgs., XP_31200980A, Institute of Electrical and Electronics Engineers.

IEEE, "7. Frame Formats," 802.11s-2011—IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment 10: Mesh Networking, Sep. 10, 2011, p. 19, Institute of Electrical and Electronics Engineers.

* cited by examiner

ESTABLISHING RELIABLE ROUTES WITHOUT EXPENSIVE MESH PEERING

CROSS-REFERENCE TO RELATED APPLICATIONS

This application is related to U.S. Non-Provisional patent application Ser. No. 14/279,717 by Patil et al., entitled REDUCING BROADCAST DUPLICATION IN HYBRID WIRELESS MESH PROTOCOL ROUTING, filed on May 16, 2014.

BACKGROUND

The following relates generally to wireless communication, and more specifically to wireless communications via a mesh network. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Mobile devices (and other wireless communication devices) may form networks without base stations or equipment other than the mobile devices themselves. One example of such networks is known as a mesh network. In order for a device to join a mesh network, the device must "peer" with the member devices of the mesh network. The member devices (peers) may use a secure password-based authentication and key establishment protocol called "Simultaneous Authentication of Equals" (SAE) to peer. When the device wishing to join and each of the member devices discover each other (and security is enabled), the device wishing to join performs a separate SAE exchange with each of the member devices. If SAE completes successfully, each peer knows the other party possesses the mesh password and, as a by-product of the SAE exchange, the device wishing to join establishes a cryptographically strong key with each of the member devices. The joining device, once the SAE exchange completes successfully, learns the topology of the mesh network as well as the route to a provider device based on each of the member devices it has peered with.

However, problems for mesh networks result from such conventional secure peering. First, conventional peering involves an exchange of many messages with each individual member device of the mesh network in order to join the network. Overhead associated with maintaining state information for each peer in the mesh network may also reduce the overall performance of devices in the network. Second, the joining device must complete the peering procedure with every member device of the mesh network in order to learn the mesh network topology and determine a route to a member device providing a service, e.g., access to the internet.

SUMMARY

The described features generally relate to one or more improved systems, methods, and/or apparatuses for communications via a mesh network. In general, the approach is to simplify peering for joining a mesh network and, based on the simplified peering, allow the joining device to learn the topology of the mesh network and a route to a provider member device without having to peer with every other member device. Once a wireless communication device identifies a member device of an existing mesh network, the wireless communication device may communicate with the identified member device to execute an authentication procedure. Upon successfully completing the authentication procedure, the wireless communication device may join the existing mesh network without needing to peer with other member devices of the mesh network. Once the wireless communication device joins the existing mesh network, it may send a route request message to the other member devices and receive route reply messages from the other member devices in response. The wireless communication device may utilize the route request/route reply exchange to determine a route to a member device providing a service to the mesh network.

Another aspect is the use of a common group key that the joining device receives during the authentication process with the single member device. The route request/route reply messages may be encrypted/decrypted using the common group key, respectively.

In a first set of illustrative embodiments, a method for communications via a mesh network is described. The method may include: joining an existing mesh network by authenticating with only one of a plurality of member devices of the existing mesh network; sending a route request message to one or more of the plurality of member devices of the existing mesh network; receiving one or more route reply messages from one or more of the plurality of member devices of the existing mesh network; and determining a route to one or more provider member devices of the existing mesh network based on the received route reply messages.

In some aspects, the method may include receiving a common group key during authentication with the only one of the plurality of member devices of the existing mesh network. The method may include encrypting the route request message with the common group key. The method may include sending the encrypted route request message to the one or more member devices via the mesh network. The route reply messages may be encrypted with the common group key and the method may include receiving the route reply message via the mesh network and decrypting the received route reply messages using the common group key. Determining the route may include determining a topology of the existing mesh network based on the received route reply messages from the one or more of the plurality of member devices of the existing mesh network; and determining the route to the one or more provider member devices based on the topology of the existing mesh network.

In some aspects, the method may include receiving a root announcement message from at least one of the one or more provider member devices. The root announcement message may be encrypted with the common group key. The method may include decrypting the root announcement message using the common group key; and determining a route to the at least one provider member device based at least in part on the root announcement message. The root announcement message may be received during a paging window.

In some aspects, the method may include sending the route request message during a predetermined time interval. The predetermined time interval may be a paging window configured for the existing mesh network. The paging window may occur during a synchronized time interval for the existing mesh network and all of the member devices of the existing mesh network are in an active state during the paging window time interval.

In some aspects, the method may include monitoring for subsequent route request messages and associated route reply messages communicated between other member devices of the existing mesh network; and updating the route to the one or more provider member devices of the existing mesh network based on the monitored route reply messages. The method may include decrypting the subsequent route request reply messages with the common group key. Updating the route may include determining a topology of the existing mesh network based on the subsequent route reply messages from the other member devices of the existing mesh network; and updating the route to the one or more provider member devices based on the topology.

In some aspects, determining the route may include determining one or more of a hop count to the one or more provider member devices of the existing mesh network and a channel condition for each hop between the one or more provider member devices and other member devices of the existing mesh network. The mesh network may be a social WiFi mesh network.

In a second set of illustrative embodiments, an apparatus for communications by a wireless communication device via a mesh network is described. The apparatus may include a processor module configured to join an existing mesh network by authenticating with only one of a plurality of member devices of the existing mesh network; and a communications management module configured to send a route request message to one or more of the plurality of member devices of the existing mesh network, receive one or more route reply messages from one or more of the plurality of member devices of the existing mesh network, and determine a route to one or more provider member devices of the existing mesh network based on the received route reply messages.

In some aspects, the communications management module may also be configured to receive a common group key during authentication with the only one of the plurality of member devices of the existing mesh network. The communications management module may also be configured to encrypt the route request message with the common group key. The communications management module may also be configured to send the encrypted route request message to the one or more member devices via the mesh network. The route reply messages may be encrypted with the common group key.

In some aspects, the communications management module may also be configured to receive the route reply message via the mesh network, and decrypt the received route reply messages using the common group key. The communications management module may also be configured to determine the route by determining a topology of the existing mesh network based on the received route reply messages from the one or more of the plurality of member devices of the existing mesh network, and determining the route to the one or more provider member devices based on the topology. The communications management module may also be configured to receive a root announcement message from at least one of the one or more provider member devices. The root announcement message may be encrypted with the common group key.

In some aspects, the communications management module may also be configured to decrypt the root announcement message using the common group key, and determine the route to the at least one provider member device based at least in part on the root announcement message. The root announcement message may be received during a paging window. The communications management module may also be configured to send the route request message during a predetermined time interval. The predetermined time interval may be a paging window configured for the existing mesh network. The communications management module may also be configured to: monitor for subsequent route request messages and associated route reply messages communicated between other member devices of the existing mesh network; and update the route to the one or more provider member devices of the existing mesh network based on the monitored route reply messages.

In a third set of illustrative embodiments, an apparatus for communications by a wireless communication device via a mesh network is described. The apparatus may include at least one processor; a memory in electronic communication with the at least one processor; and instructions stored in the memory, the instructions being executable by the at least one processor. The instructions may be executable to: join an existing mesh network by authenticating with only one of a plurality of member devices of the existing mesh network; send a route request message to one or more of the plurality of member devices of the existing mesh network; receive one or more route reply messages from one or more of the plurality of member devices of the existing mesh network; and determine a route to one or more provider member devices of the existing mesh network based on the received route reply messages.

In some aspects, the instructions may be further executable by the at least one processor to receive a common group key during authentication with the only one of the plurality of member devices of the existing mesh network. The instructions may be further executable by the at least one processor to encrypt the route request message with the common group key. The instructions may be further executable by the at least one processor to send the encrypted route request message to the one or more member devices via the mesh network. The route reply messages may be encrypted with the common group key. The instructions may be further executable by the at least one processor to: receive the route reply message via the mesh network; and decrypt the received route reply messages using the common group key.

In some aspects, the instructions may be further executable by the at least one processor to determine the route by determining a topology of the existing mesh network based on the received route reply messages from the one or more of the plurality of member devices of the existing mesh network, and determine the route based on the topology. The instructions may be further executable by the at least one processor to: monitor for subsequent route request messages and associated route reply messages communicated between other member devices of the existing mesh network; and update the route to the one or more provider member devices of the existing mesh network based on the monitored route reply messages.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
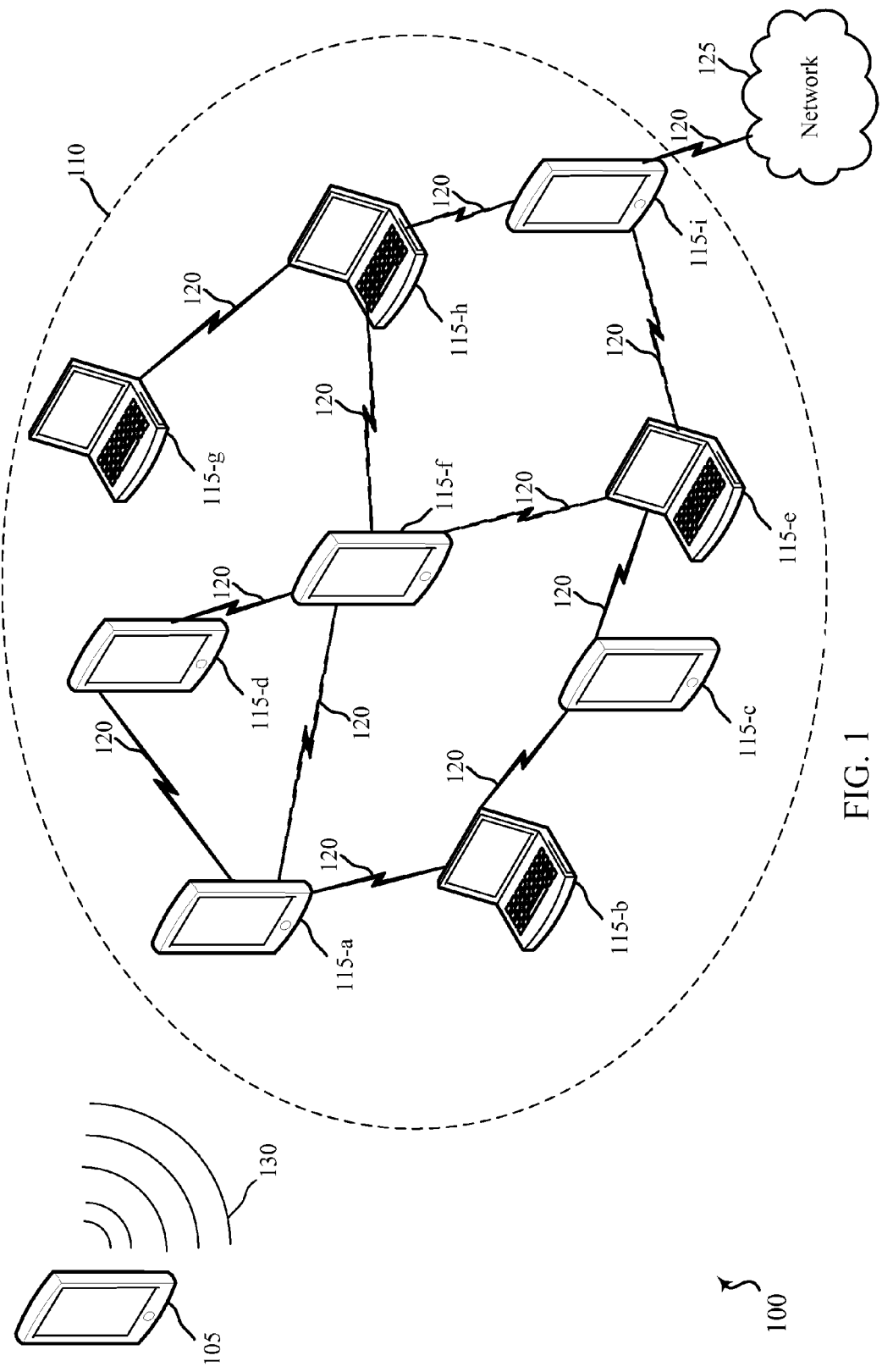
FIG. 1 shows a block diagram of a mesh network with a separate wireless communication device in proximity.

A mesh network may be a full mesh network in which each member device has a connection with every other device of the network. Also, a mesh network may be a partial mesh network in which some member devices may be connected in a full mesh scheme, but other member devices are only connected to one or more of the devices, but not all of the member devices of the network. Further, social Wi-Fi mesh networks may extend the capabilities of a social Wi-Fi framework to enable participating devices to establish mesh connectivity for content delivery. Mesh networks may be formed between a device and one or more other devices to provide one or more services to the device from the other device(s). In order to establish a mesh network for such communications, the device (joining device) may discover or otherwise become aware of the other device(s). These other devices may be referred to as member device(s). One or more of the other member device(s) may provide a desired service, e.g., access to the Internet. The other member device(s) may be referred to as a provider member device(s).

If only one other device is discovered, the joining device may negotiate with the other device to form a mesh network. On the other hand, if the joining device discovers one or more devices belonging to an existing mesh network, the joining device may join the existing mesh network. As noted above, conventional secure peering in accordance with the IEEE 802.11s standard involves many messages (e.g., eight) which must be repeated for each individual device of the network within its range to join the network. In accordance with such conventional peering, the joining device must repeat the peering process with each other device of the existing mesh network within its range to determine aspects of the topology of the network as well as determine a route to a provider member device, e.g., to determine hop counts, etc.

In one example of an approach to resolve problems with this known peering and route determination procedure, a wireless communication device may join an existing mesh network by authenticating with only one of the member devices of the existing mesh network. Upon successfully completing the single authentication procedure, the wireless communication device may receive a group key common to the devices of the mesh network and use the common group key to discover the topology of the existing mesh network by sending a route request message to the other devices and receiving route reply messages from one or more of the other devices. Based on the received route reply messages, the joining device may determine a topology of the mesh network and, accordingly, determine a route or path to a provider device of the mesh network providing a desired service. As a result, the process for peering to join the existing mesh network and discovering the network topology and route though the mesh network is simplified and avoids the expensive mesh peering typically associated with known techniques.

Referring first to FIG. 1, an arrangement 100 is shown that includes an established mesh network 110. The mesh network 110 may be implemented as a wired or wireless communication network of various fixed and/or mobile devices that may be referred to as "nodes" 115 of the mesh network 110. Each of the node devices 115 may receive and communicate data throughout the mesh network, such as throughout a college campus, metropolitan area, community network, and across other geographic areas. A node device 115 may also function to route data from one node to another within the mesh network. In addition, each node typically has more than one communication link to and/or from other nodes of the network, which provides for redundant communication links and a reliable communication system.

The wireless mesh network 110 may include various node devices 115 implemented for wireless communication utilizing a data packet routing protocol. The wireless mesh network 110 may also be implemented for data communication with other networks that are communicatively linked to the mesh network 110, such as with another wireless network, wired network, wide-area-network (WAN), and the like.

In the wireless mesh network 110, communication links 120 may be formed between the various nodes 115 of the network. The data packets for wireless communications in the network may be forwarded or routed from a source node (e.g., transmitting device) to a destination node (e.g., receiving device) via intermediate node(s), which are commonly referred to as "hops" in a multi-hop wireless mesh network. The number of intermediate nodes between the transmitting device and the receiving device may be referred to as the hop count.

In one configuration, wireless communication device 105 may be in proximity of the mesh network 110. As previously mentioned, the mesh network 110 may include a plurality of nodes 115, which may be wireless communication devices. As shown in FIG. 1, the mesh network 110 is a partial mesh network, with connections or communication links 120 established between the nodes 115-a through 115-i such that each of the nodes may communicate with all of the other nodes of the mesh network 110, some directly and some indirectly. In one configuration, nodes 115 of the mesh network 110 may be referred to herein as member devices and/or as provider member devices. In general: a node that is a source of a particular service may be referred to as a provider member device; and a node that uses a particular service may be referred to as a member device.

The mesh network 110 may be connected to an external network 125, such as the Internet, by one or more of the member devices (e.g., device 115-i in this example) establishing a connection or communication link 120 with the external network 125. Although not shown, the device 115-i may establish its connection with a base station that has access to the external network 125. In this example, device 115-*i* may be referred to as a provider member device.

The wireless communication device 105 may be referred to as a seeker device or a joining device. The device 105 may "seek" to join the existing mesh network 110 to obtain one or more services that are provided by the member devices 115 of the mesh network 110. In some aspects, the member devices 115 may be referred to as advertisers, which may broadcast (advertise) the service(s) that the mesh network 110 provides. The joining device 105 may find the desired service(s) (as well as the advertiser device(s) 115 and the existing mesh network 110) via the broadcast. The device 105 may then join the existing mesh network 110 to obtain the desired service(s).

The joining device 105 and the member devices 115 may be dispersed throughout the mesh network 100, and each device may be stationary or mobile. A joining device 105 and the member devices 115 may also be referred to by those skilled in the art as mobile stations, subscriber stations, mobile units, subscriber units, wireless units, remote units, mobile devices, wireless devices, wireless communications devices, remote devices, mobile subscriber stations, access terminals, mobile terminals, wireless terminals, remote terminals, handsets, user agents, user equipments, mobile clients, clients, or some other suitable terminology. A joining device 105 and a member device 115 may be a cellular phone, a personal digital assistant (PDA), a wireless modem, a wireless communication device, a handheld device, a tablet computer, a laptop computer, a cordless phone, a wireless local loop (WLL) station, or the like.

As described further below, the wireless communication device 105 may perform a simplified peering process with the identified device, such as member device 115-*a*. If multiple devices 115 have been identified by the wireless communication device 105, the simplified peering process may be performed with only one of the identified devices 115. Thus, as described herein, the wireless communication device 105 performs only a single authentication procedure for peering with and joining the entire mesh network 110. Upon successfully completing the single authentication procedure, the wireless communication device 105 joins the existing mesh network 110 and becomes a member device. The wireless communication device 105 may then perform a route request/route reply exchange with other member devices 115 to discover the layout or topology of the existing mesh network 110 as well as determine a route to a provider member device, e.g., member device 115-*i*. The determined route may be an optimal route in the sense that the route through the mesh network has the fewest hop count, uses hops having reliable channel conditions, etc. In one example where the hop count is considered optimal, the communication device 105 may determine that the route to the provider member device 115-*i* is through member devices 115-*a*, 115-*f*, and 115-*e* (or 115-*h*). The route is shown in FIG. 1 via dashed communication links 120. Thus, the wireless communication device 105 may learn the layout and membership of the mesh network 110 without peering with every member device 115. In some aspects, the wireless communication device may then perform a peering process with the member devices 115 along the route.

Figure 2A:
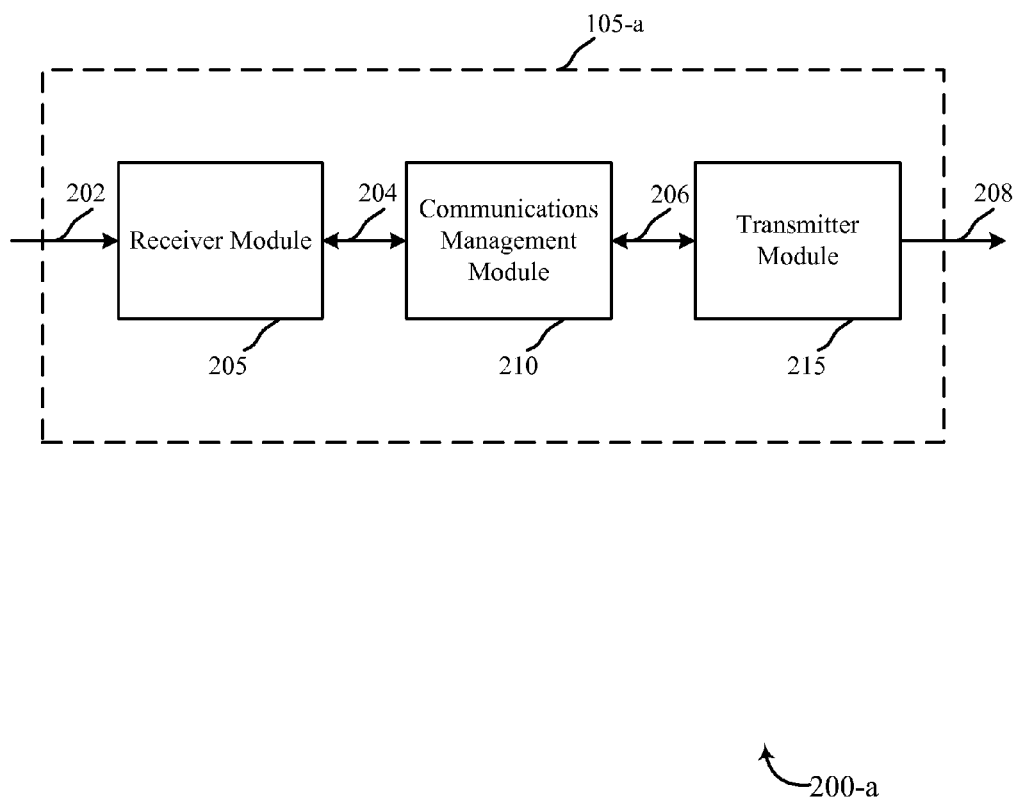
FIG. 2A shows a block diagram of an exemplary wireless communications device, in accordance with various embodiments.

Referring now to FIG. 2A, a block diagram 200-*a* illustrates a joining device 105-*a* in accordance with various embodiments. The joining device 105-*a* may be an example of one or more aspects of the wireless communication device 105 described with reference to FIG. 1. The joining device 105-*a* also may be an example of one or more aspects of the wireless communication devices 115 described with reference to FIG. 1 (e.g., being capable of cooperating with the wireless communication device 105 to perform the single authentication procedure and determine the mesh network topology). The device 105-*a* may also be a processor. The device 105-*a* may include a receiver module 205, a communications management module 210, and a transmitter module 215. Each of these components may be in communication with each other.

The components of the device 105-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The transmitter module 215 may send communications via signals 208 from the device 105-*a* to other devices, such as the member device 115-*a* of the mesh network 110 shown in FIG. 1. Sending such communications may include messages for executing the single authentication procedure. The communications may also include the route request messages utilized for discovering the other devices 115 of the existing mesh network. The transmitter module 215 may send communications by transmitting direct (addressed) communications to the member device 115-*a* once the device 105-*a* has discovered/identified a member device (e.g., the member device 115-*a* of FIG. 1). The transmitter module 215 may also send communications by transmitting broadcast (non-addressed) communications to one or more of the other member devices 115 of the existing mesh network. Such broadcast transmissions may include the route request message that is broadcast to each member device 115 participating in the existing mesh network 110. The communications management module 210 may manage such communications sent by the device 105-*a*.

The receiver module 205 may receive communications via signals 202 from the member device 115-*a* as part of the single authentication procedure. The receiver module 205 may receive messages for the authentication procedure via directed (addressed) messages transmitted from the member device 115-*a*. The receiver module 205 may receive communications via signals 202 from other member devices 115 as part of the topology discovery/route determination process. The receiver module 205 may receive one or more route reply messages from the other member devices 115 in response to the route request message transmitted by the transmitter module 215. The communications management module 210 may manage such communications received by the device 105-*a* via signal(s) 204 (e.g., control and/or data). Additionally, upon joining the existing mesh network 110, the communications management module 210 may establish connections with one or more of the member devices 115 of the mesh network 110 and may manage via signal(s) 206 (e.g., control and/or data) communications via such connections. Further details regarding the communications management module 210 will be described below.

Figure 2B:
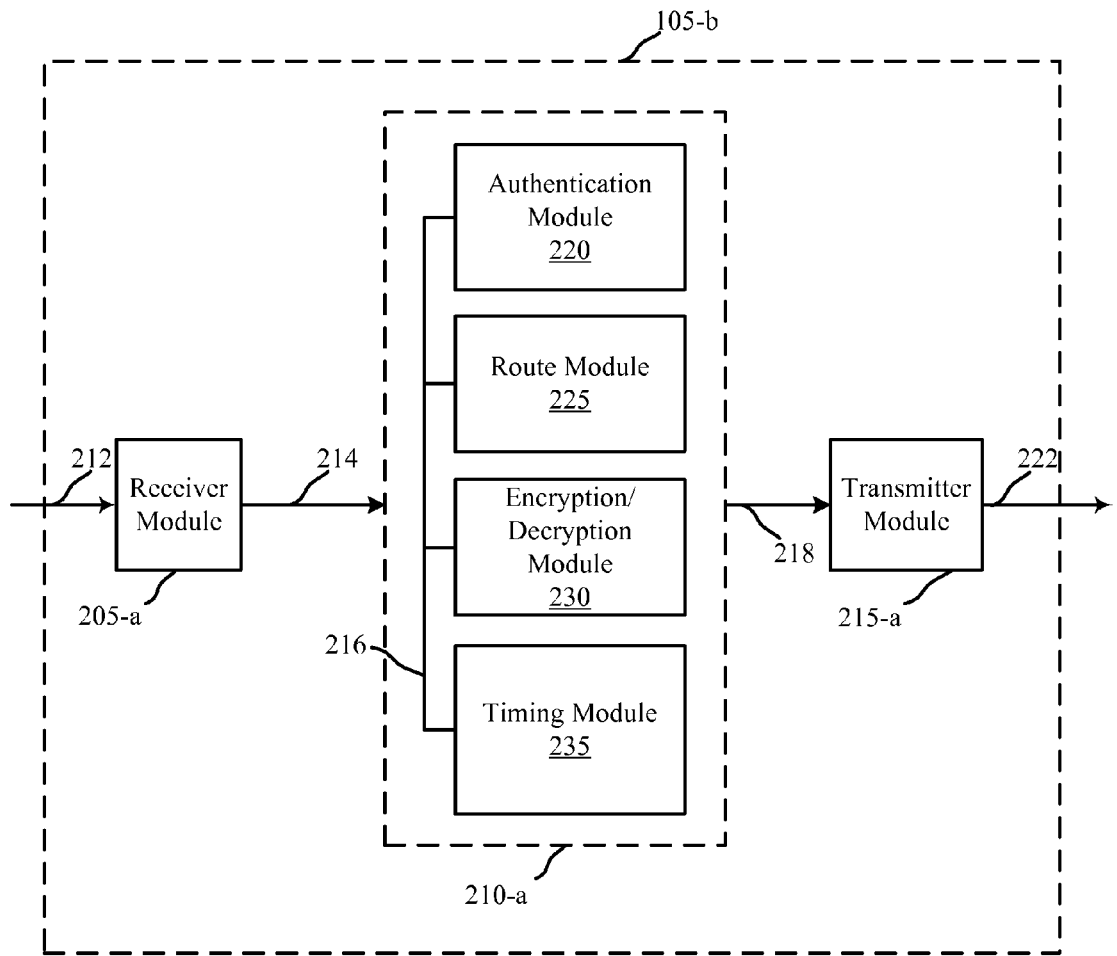
FIG. 2B shows a block diagram illustrating a further embodiment of the wireless communication device.

FIG. 2B is a block diagram 200-*b* illustrating a joining device 105-*b* in accordance with various embodiments. The device 105-*b* may be an example of one or more aspects of the wireless communication device 105, as well as the member devices 115, described with reference to FIGS. 1 and/or 2A.

The device 105-b may also be a processor. The device 105-b may include a receiver module 205-a, a communications management module 210-a, and a transmitter module 215-a. Each of these components may be in communication with each other.

The components of the device 105-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The receiver module 205-a and the transmitter module 215-a may be examples of receiver module 205 and transmitter module 215, respectively, and may be configured to perform operations (e.g., via signals 212 and 222, respectively) as previously described with reference to FIG. 2A. The communications management module 210-a may be an example of communications management module 210 and may include an authentication module 220, a route module 225, an encryption/decryption module 230, and a timing module 235.

The communications management module 210-a may be configured to perform the various functions described above with respect to FIG. 2A. In this example, the communications management module 210-a may manage (via internal signals 216) an authentication process to join the existing mesh network 110 providing one or more services that the device 105-b desires. The communications management module 210-a may further manage a route optimization process for discovering the topology of the existing mesh network 110 as well as determining a route to a provider member device 115 providing such services, e.g., member device 115-i of the mesh network 110. The device 105-b or the communications management module 210-a may include a processor for performing such functionality.

The authentication module 220 may be configured to execute various operations to participate in the single authentication procedure as described herein. In some embodiments, the authentication module 220 may generate and provide messages to the transmitter module 215-a, via signals 218, to be transmitted via signals 222 to the member device 115-a participating in the single authentication procedure. Further, the authentication module 220 may be configured to process messages obtained via signals 214 from the receiver module 205-a, which are received via signals 212 from the member device 115-a as part of the single authentication procedure. Thus, the authentication module 220 may cooperate with the communications management module 210-a (or other components thereof), the receiver module 205-a and the transmitter module 215-a in carrying out its operations.

The route module 225 may be configured to execute various operations to determine a route to a provider member device 115 of the existing mesh network 110. In some embodiments, the route module 225 may generate and provide one or more route request messages to the transmitter module 215-a via signals 218 to be transmitted via signals 222 to the other member devices 115 of the existing mesh network. In some embodiments, the route request messages may be transmitted through the member device 115-a that the device 105-b has peered with and on to the other member devices 115. Additionally or alternatively, the route request messages may be broadcast to all member devices 115 participating in the mesh network that are proximate the device 105-b. The route request messages may include information to solicit a response from the other member devices 115 that includes information associated with the mesh network 110 and/or the responding member device 115.

In some embodiments, the route module 225 may receive, via signals 214, one or more route reply messages from the receiver module 205-a, that were received via signals 212 from the other member devices 115. The route reply messages may be received in response to the route request messages. The route reply messages may include information associated with the existing mesh network 110. In some exemplary embodiments, the route reply messages may include: (1) identification information associated with each of the member devices 115 that transmit a route reply message; (2) channel quality information (e.g., signal strength, interference level, etc.) from each responding member device 115 indicative of the channel conditions between the responding member device 115 and the other member devices 115 it communicates with; (3) hop count information from a responding member device 115 to other member devices 115, including a provider member device 115 providing a desired service; (4) and other information associated with the existing mesh network 110 that may aid the joining device 105-b in discovering the mesh network 110.

The route module 225 may utilize the information contained in the received route reply messages to determine its neighbors (e.g., to discover the other participating devices 115 of the existing mesh network 110). Based on this discovered mesh network 110 topology, the route module 225 may determine a route to a provider member device 115 of the mesh network 110. For instance and referring to FIG. 1, the joining device 105-b may determine that the optimal route to the member device 115-i may be through member devices 115-a, 115-f, 115-e (or 115-h), via communication links 120. The route module 225 may determine the route is optimal based on the hop count, channel conditions, network load, etc., as discussed above. Accordingly, the device 105-b may determine its route to access the network 125 through the mesh network 110. Further, the determined route may be a reliable route in that, based on the channel conditions, network load, etc., the route to the provider member device 115-i is less susceptible to communication errors, fading signals, and the like.

The communications management module 210-a may manage (via internal signals 216) security for the device 105-b. The device 105-b or the communications management module 210-a may include a processor for performing such functionality.

According to various embodiments, the device 105-b may receive a common group key from the member device 115-a during the signal authentication process. The common group key may be shared with each participating member device 115 of the mesh network 110. The encryption/decryption module 230 may be configured to perform security operations including encryption and decryption operations utilizing the common group key. With respect to the single authentication procedure, which should be secure, the encryption/decryption module 230 may, via signals 216 exchanged with the authentication module 220, encrypt the messages generated by the authentication module 220 and may decrypt the messages received from the member device 115-a.

The encryption/decryption module 230 also may be configured to perform security operations for communications between the joining device 105-b and one or more of the member devices 115 once the device 105-*b* has joined the mesh network. The communications within the mesh network 110 should be secure. With respect to the route optimization process, the encryption/decryption module 230 may, via signals 216 exchanged with the route module 225, encrypt the route request messages and may decrypt the route reply messages received from the member devices 115 using the common group key. Thus, only participating member devices 115 may have the common group key and, therefore, be able to receive, process, and respond to the route request messages. That is, as the participating member devices 115 share the common group key, this obviates the need for the joining device 105-*b* to form a mesh peering connection with all of the participating member devices 115 to participate in the route request/reply exchanges.

Figure 3:
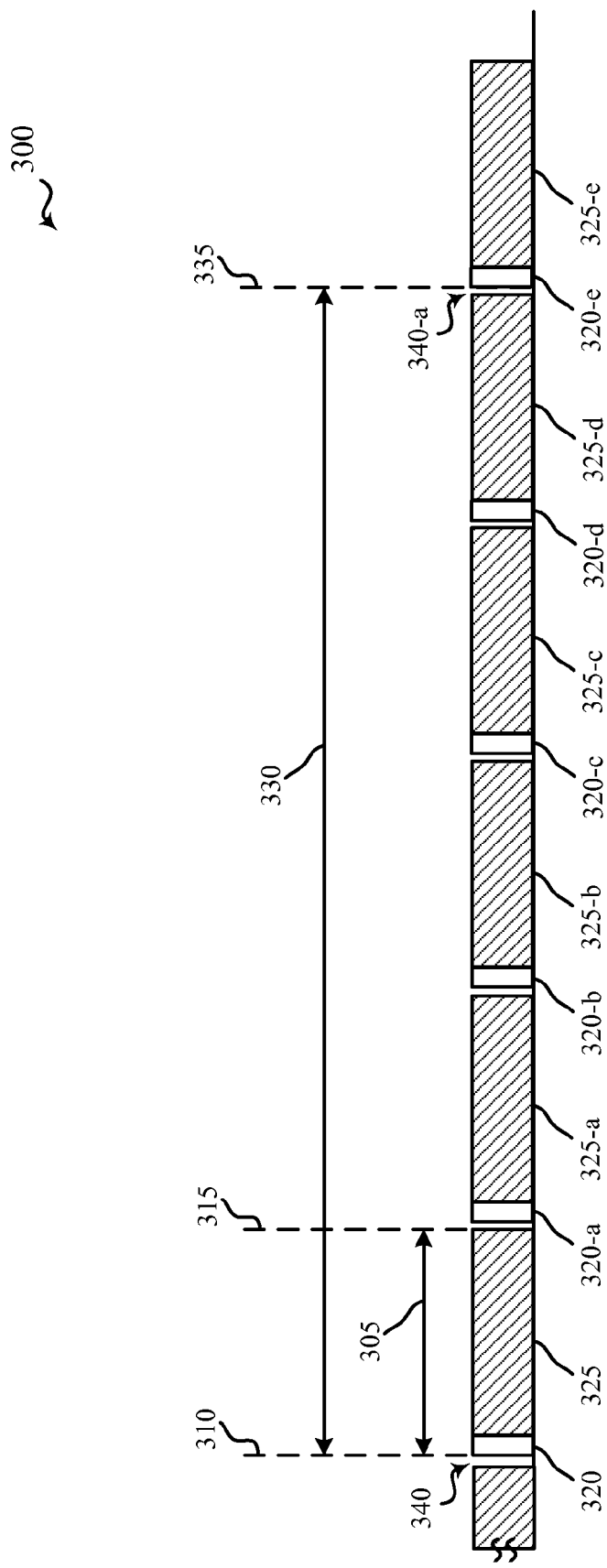
FIG. 3 shows a timing diagram illustrating timing aspects, in accordance with various embodiments.

The timing module 235 may be configured to execute various operations regarding the timing of functions related to determining a route to a provider member device 115 of the existing mesh network 110. The description of the timing module 235 will be described in connection with FIG. 3 for ease of reference. FIG. 3 shows a timing diagram 300 illustrating various timing aspects of the present disclosure, according to various embodiments. The timing diagram 300 may be implemented by one or more aspects of the wireless communication device 105 and/or the member devices 115, described with reference to FIGS. 1, 2A and/or 2B.

Generally, the timing module 235 may communicate with the authentication module 220 and/or the route module 225 via signals 216 to control the timing of the various described functions. According to certain embodiments, the existing mesh network 110 may be a synchronized network, i.e., all of the participating member device 115 may share a common timing reference to enable synchronized communications. Generally, the shared reference timing may include a transmission window 305 and a discovery window 340. The transmission window 305 may be defined as between times 310 and 315 and may include a paging window 320 at the beginning of the transmission window 305 as well as a transmission block 325. Generally, the participating member devices 115 may all wake up during the paging window 320 to listen to the paging channel to determine whether there is any traffic being sent to the device 115. If there is traffic being sent, the device 115 may remain awake during the transmission block 325 to exchange the traffic (i.e., control or data information). If there is no traffic being sent, the device 115 may transition back to a sleep state during the transmission block 325 to conserve power.

The discovery window 340 may occur during the time period between transmission windows 305. In some embodiments, the discovery window 340 may not occur before every transmission window 305 but may, instead, occur once per timing interval 330, e.g., between a predetermined number of paging windows 305. In the example shown in FIG. 3, the timing interval 330 may be defined as the time period between times 310 and 335.

Returning to the description of the timing module 235, the timing module 235 may be configured to execute various functions relating to the timing of aspects of the device 105-*b*. In some embodiments, the timing module 235 may communicate, via signal 216, with the authentication module 220 to control the timing of the single authentication process described above. For example, the timing module 235 may control the timing of one or more of the messages associated with the authentication procedure. In other aspects, the timing module 235 may communicate with the authentication module 220 to control when the authentication module 220 may transmit one or more discovery signals during the discovery window 340.

In further embodiments, the timing module 235 may communicate, via signals 216, with the route module to control the timing of the transmission of the route request messages. During the single authentication procedure, the device 105-*b* may receive the shared timing reference signal of the mesh network 110.

Accordingly, the device 105-*b*, once joined to the mesh network 110, may know when the transmission window 305 occurs, and the associated paging window 320. The timing module 235 may communicate with the route module 225 and/or the transmitter module 215-*a* to transmit the route request messages during the paging window 320 to ensure that each participating device 115 of the mesh network is awake and listening. Further, the timing module 235 may communicate with the receiver module 205-*a* and/or the route module 225 to listen for route reply messages being sent from the other member devices 115 via signals 212. The timing module 235 may communicate with the other components of the device 105-*b*, subsequently, to participate in additional routing procedures for new wireless communication devices wishing to join the mesh network 110.

Figure 4:
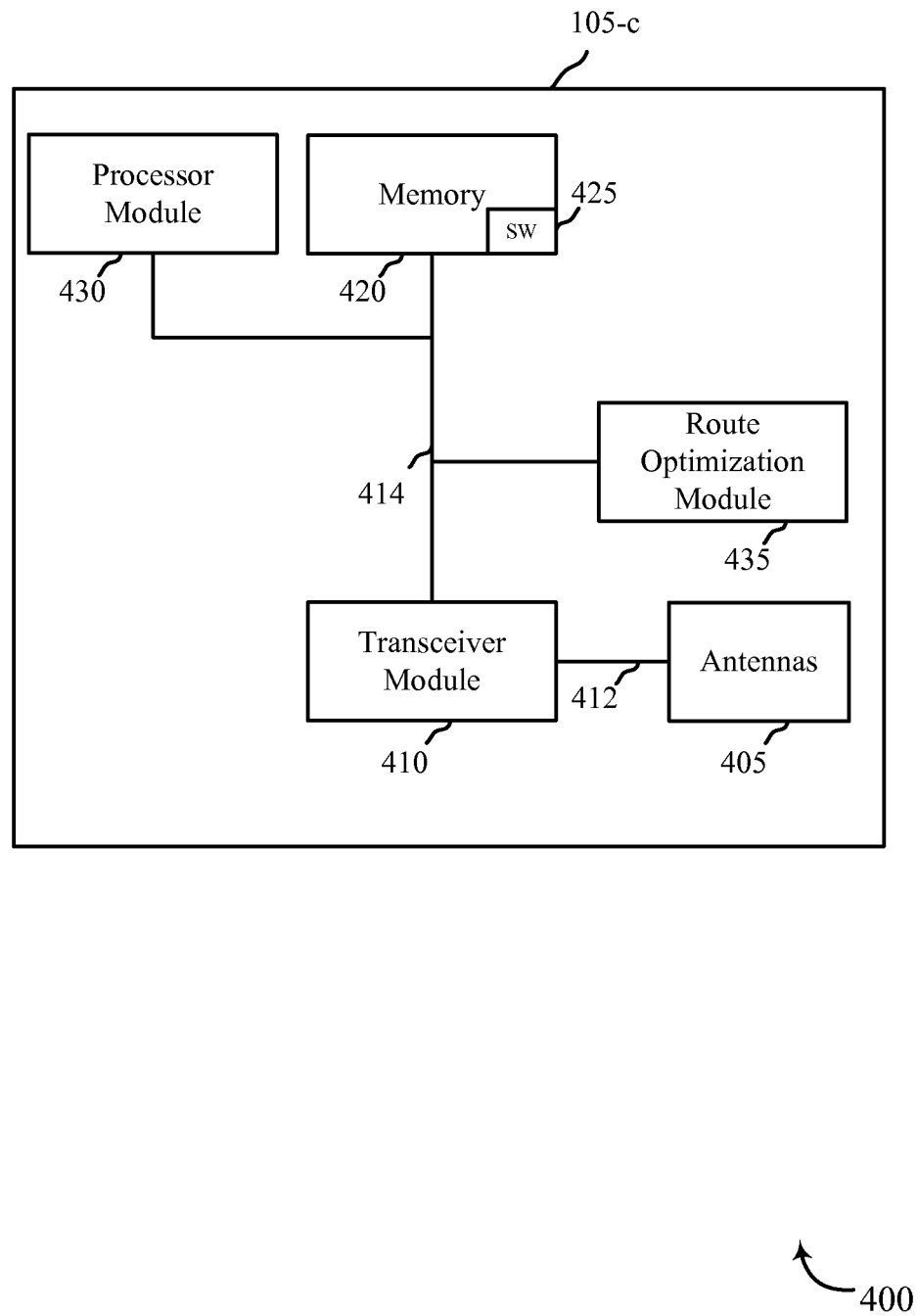
FIG. 4 shows a block diagram of one configuration of a wireless communication device, in accordance with various embodiments.

FIG. 4 is a block diagram 400 illustrating a device 105-*c* according to various embodiments. The device 105-*c* may operate as either a joining device or as a member device as described herein, depending on actual use of the device 105-*c*. The device 105-*c* may be configured to participate in a discovery process for obtaining desired services via mesh networking 110. Thus, the device 105-*c* may be the device 105 and/or the devices 115 of FIGS. 1, 2A, and/or 2B, respectively. The device 105-*c* may have any of various configurations, such as personal computers (e.g., laptop computers, netbook computers, tablet computers, etc.), cellular telephones, PDAs, digital video recorders (DVRs), internet appliances, gaming consoles, e-readers, etc. The device 105-*c* may have an internal power supply (not shown), such as a small battery, to facilitate mobile operation.

In the configuration shown, the device 105-*c* includes one or more antennas 405, a transceiver module 410, a route optimization module 435, memory 420, and a processor module 430, which each may be in communication, directly or indirectly, with each other (e.g., via one or more buses 414). The transceiver module 410 may be configured to communicate bi-directionally via signals 412 sent to and received from the antenna(s) 405, as described above. For example, the transceiver module 410 may be configured to communicate bi-directionally with other devices 105 and/or 115 of FIGS. 1, 2A, and/or 2B. The transceiver module 410 may include the receiver module 205 and the transmitter module 215 of FIGS. 2A and/or 2B, as previously described. In one embodiment, the transceiver module 410 may further include a modem configured to modulate packets and provide the modulated packets to the antenna(s) 405 for transmission, and to demodulate packets received from the antenna(s) 405. While the device 105-*c* may include a single antenna, the device 105-*c* will typically include multiple antennas 405 for multiple links.

The memory 420 may include random access memory (RAM) and read-only memory (ROM). The memory 420 may store computer-readable, computer-executable software code 425 containing instructions that are configured to, when executed, cause the processor module 430 to perform various functions described herein (e.g., identify/determine/obtain audio and/or video streams, graphics resources, and/or rendering instructions, receive, transmit, etc.). Alternatively, the software 425 may not be directly executable by the processor module 430 but be configured to cause the computer (e.g., when compiled and executed) to perform functions described herein.

The processor module 430 may include an intelligent hardware device, e.g., a central processing unit (CPU), a microcontroller, an application specific integrated circuit (ASIC), etc. The processor module 430 may include a speech encoder (not shown) configured to receive audio via a microphone, convert the audio into packets (e.g., 30 ms in length) representative of the received audio, provide the audio packets to the transceiver module 410, and provide indications of whether a user is speaking. Alternatively, an encoder may only provide packets to the transceiver module 410, with the provision or withholding/suppression of the packet itself providing the indication of whether a user is speaking.

The route optimization module 435 may be a component of the device 105-c in communication with some or all of the other components of the device 105-c via the bus 414. Alternatively, functionality of the route optimization module 435 may be implemented as a component of the transceiver module 410, as a computer program product, and/or as one or more controller elements of the processor module 430. The route optimization module 435 may be an example of one or more aspects of one of the communications management modules 210 described with reference to FIGS. 2A and/or 2B. Thus, the route optimization module 435 may be configured to perform the various operations or provide the functionality described herein.

For instance, the route optimization module 435 may be configured to perform the single authentication procedure to join the existing mesh network 110 and, once joined, complete the route request/route reply exchange to learn the layout of the mesh network 110. Accordingly, the route optimization module 435 may determine a route to a provider member device 115 of the mesh network 110.

The components of the device 105-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 105-c as described herein.

Figure 5:
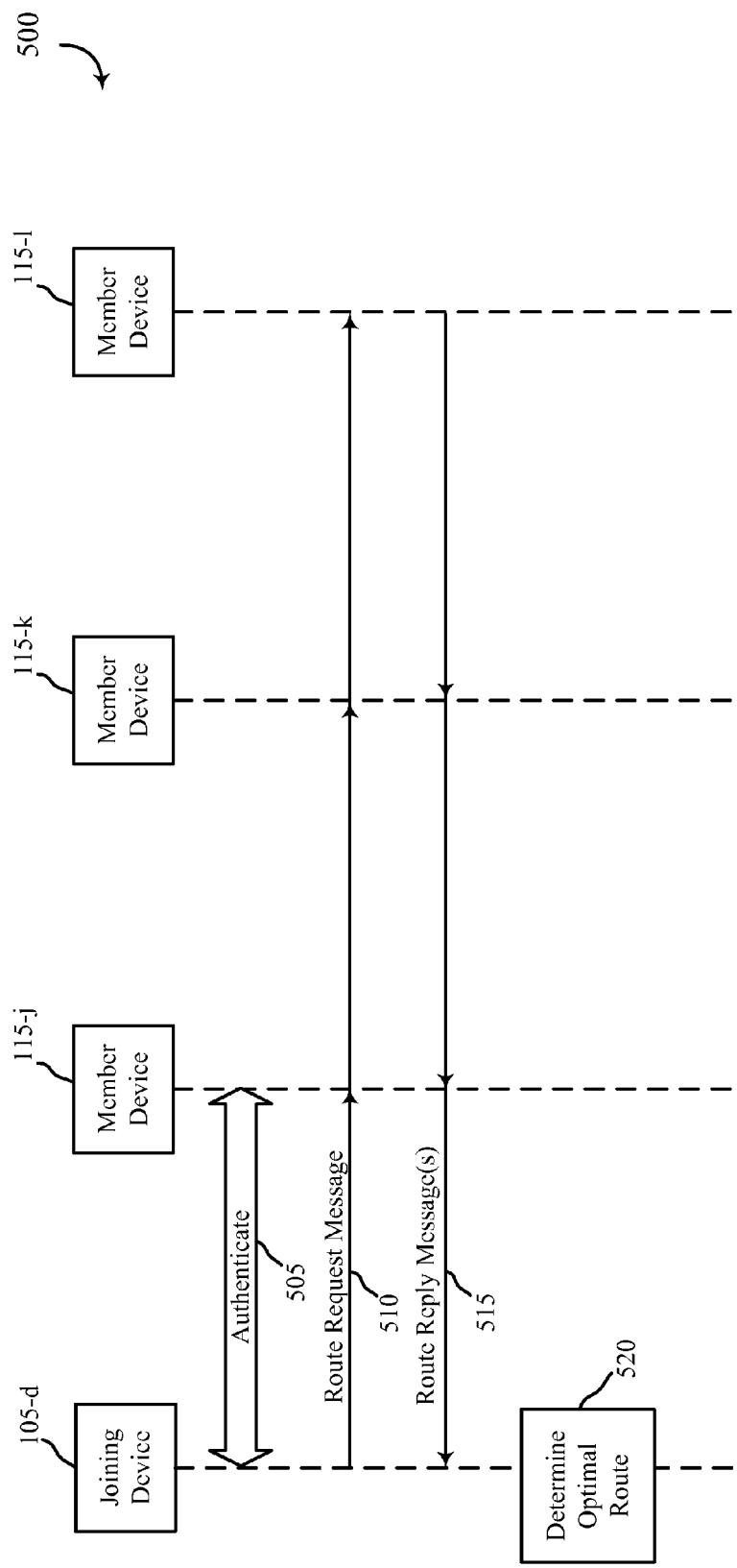
FIG. 5 is a message flow diagram illustrating a flow of communications between a joining device and member devices, in accordance with various embodiments.

FIG. 5 is a message flow diagram 500 illustrating one example of communications between a joining device, such as the wireless communication device 105-d and member devices 115-j, 115-k, and 115-l of an existing mesh network 110, as described above with respect to FIG. 1. The joining device 105-d also may be an example of the device 105 of FIGS. 2A, 2B and/or 4. The member devices 115 may be examples of the devices 115 illustrated in FIG. 1.

In one configuration, the joining device 105-d and the member device 115-j may communicate so that the services desired by the joining device 105-d and the existing mesh network 110 (including the member device 115-j) are found. The joining device 105-d and the member device 115-j may engage in an authentication procedure, denoted 505 in FIG. 5. The authentication procedure 505 may be an implementation of the single authentication procedure described herein. For example, the authentication procedure 505 may include exchanging a plurality of messages to establish a secure peering between the joining device 105-d and the member device 115-j.

Upon successful completion of the authentication procedure 505, the joining device 105-d may join the existing mesh network 110 and send a route request message, denoted 510, and receive one or more route reply messages, denoted 515. The route request/route reply message exchange may occur via the mesh network 110. That is, the device 105-d may send the route request messages 510 through, or via, the mesh network 110 and, correspondingly, receive the route reply messages 515 though, or via the mesh network 110. Although the flow diagram 500 shows the route request and route reply messages being transmitted from one member device 115 to the next, e.g., from member device 115-j to member device 115-k and then from member device 115-k to member device 115-l, and vice versa, it can be appreciated that the messages may take a different path as they propagate through the mesh network.

The joining device 105-d may utilize the information contained in the route reply messages to determine a route, e.g., an optimal route having the fewest hop counts, etc., to a provider member device of the mesh network 110, denoted 520. The joining device 105-d may utilize the information to discover the topology of the mesh network 110, to determine a hop count to the provider member device 115 providing a desired service, to determine channel conditions associated with one or more of the hops, etc., to determine the optimal route. In some embodiments, once the joining device 105-d determines its route, it may then peer connect to the other member devices 115 along the route.

Figure 6:
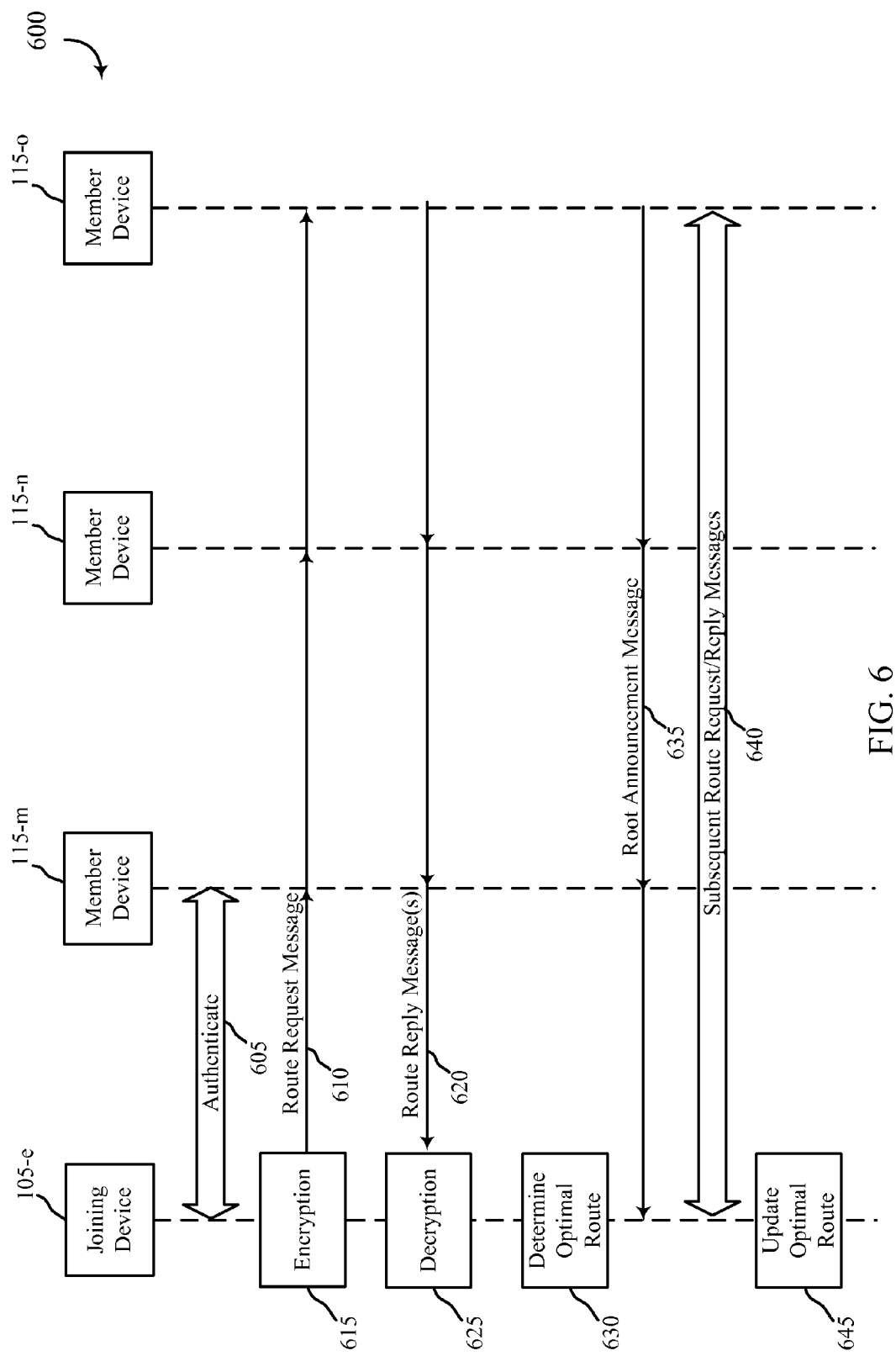
FIG. 6 is a message flow diagram illustrating a further flow of communications between a joining device and member devices, in accordance with various embodiments.

FIG. 6 is a message flow diagram 600 illustrating another example of communications between a joining device, such as the wireless communication device 105-e and member devices 115-m, 115-n, and 115-o of an existing mesh network 110, as described above with respect to FIG. 1. The joining device 105-e also may be an example of the device 105 of FIGS. 1, 2A, 2B, 4, and/or 5. The member devices 115 may be examples of the devices 115 illustrated in FIGS. 1 and/or 5.

In one configuration, the joining device 105-e and the member device 115-m may communicate and engage in an authentication procedure, denoted 605 in FIG. 6. The authentication procedure 605 may be an implementation of the single authentication procedure and may include exchanging a plurality of messages to establish a secure peering between the joining device 105-e and the member device 115-m. In the embodiment of FIG. 6, the joining device 105-e may receive a common group key associated with the mesh network 110 from the peered member device 115-m. The common group key may be shared amongst the participating member devices 115 of the mesh network 110, e.g., by the member devices 115-m, 115-n, and 115-o.

Upon successful completion of the authentication procedure 605, the joining device 105-e may join the existing mesh network 110. The joining device 105-e may send a route request message, denoted 610, and receive one or more route reply messages, denoted 620, via the mesh network 110. The joining device 105-e may encrypt, denoted 615, the route request message 610 and, correspondingly, decrypt, denoted 625, the route reply messages using the common group key. As the other member devices 115 participating in the mesh network 110 have the common group key, they may, correspondingly, receive, decrypt, and process the route request messages from the joining device 105-e using the common group key. Similarly, the other member devices 115 participating in the mesh network 110 may also encrypt the route reply messages 620 sent to the joining device 105-*e*. As previously discussed, the device 105-*e* may send the route request messages 610 through, or via, the mesh network 110 and, correspondingly, receive the route reply messages 620 though, or via the mesh network 110. The joining device 105-*e* may utilize the information contained in the route reply messages 620 to determine a route to a provider member device of the mesh network 110, denoted 630.

Turning now to additional aspects of various embodiments of the present disclosure, the joining device 105-*e* may update its information relating to the topology of the existing mesh network 110, e.g., based on member devices 115 joining and/or leaving the mesh network. As such, the joining device 105-*e* may update its route to the provider member device 115 based on the updated topology information.

According to certain embodiments, a provider member device 115 (not shown) of the existing mesh network may periodically (e.g., during the paging window 320 discussed above) send a message to announce their presence and/or the services being provided by the provider member device 115. These messages may be referred to as root announcement messages 635 based on the provider member devices 115 also being referred to as root devices. The root announcement messages 635 may be encrypted with the common group key. The joining device 105-*e* may monitor for and receive such root announcement messages 635 and use this information to update its route determination, denoted 645, to a provider member device 115. Although not shown in FIG. 6, the joining device 105-*e* may determine its route to a provider member device 115 based on a root announcement message 635 received in conjunction with the route request/route reply exchange discussed herein. That is, the joining device 105-*e* may supplement and/or supplant the information received in the route reply messages 620 with the information contained in the root announcement messages 635 to determine the route at 630.

According to certain embodiments, the joining device 115-*e* may monitor and/or participate in subsequent route request/route reply message exchanges, denoted 640, to update its route determination. For instance, when a new device 105 joins the existing mesh network and sends its route request message, the joining device 105-*e* may monitor the route reply messages percolating through the mesh network 110 from other member devices 115 to re-discover its neighbors. Accordingly, the joining device 105-*e* may update its information relating to the topology, hop count, channel conditions, etc., relating to the mesh network 110 and, if necessary, determine a new route to the provider member device 115. As can be appreciated, once the joining device 105-*e* joins the mesh network 110, it might be considered a member device 115 from the perspective of the new device 105.

According to certain embodiments, the timing associated with the communication flow 600 may be in accordance with the timing diagram of FIG. 3. For instance, the route request messages 610, route reply messages 620, the root announcement messages 635 and/or subsequent route request/reply messages 640 may be communicated during the paging window 320.

Figure 7:
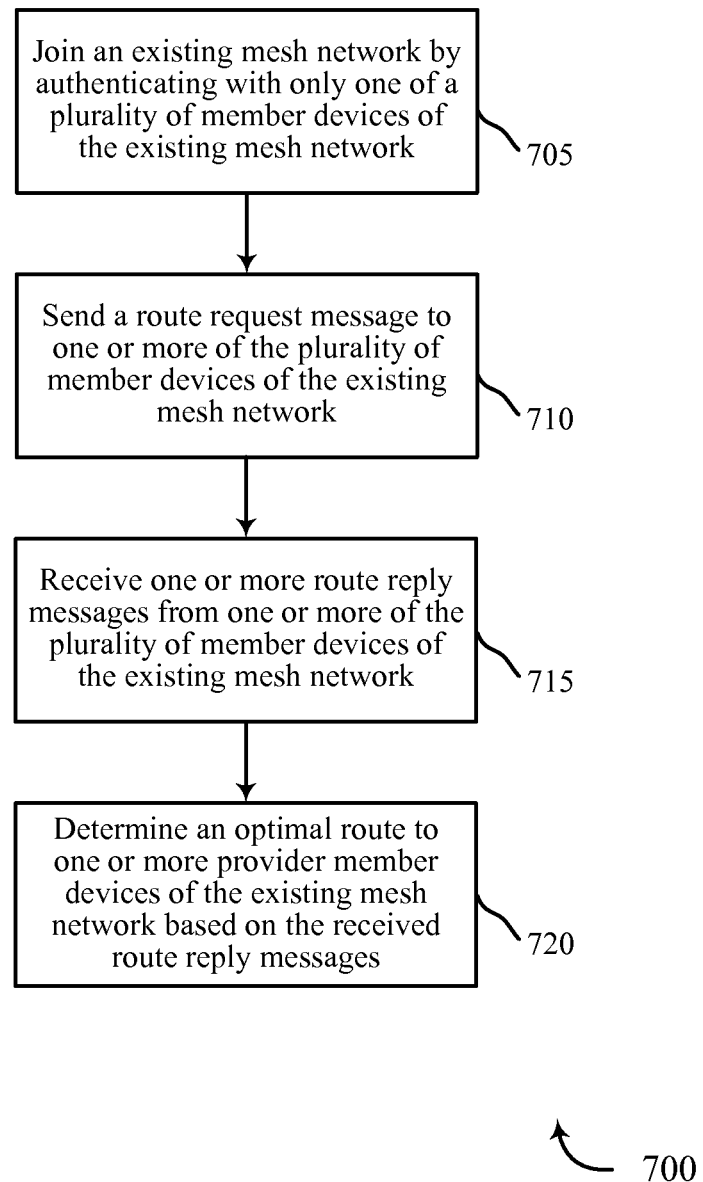
FIG. 7 is a flowchart illustrating an embodiment of a method for communications via a mesh network, in accordance with various embodiments.

FIG. 7 is a flowchart illustrating an embodiment of a method 700 performed by a joining device 105 for communications via a mesh network, such as for obtaining one or more services thereby. For clarity, the method 700 is described below with reference to the arrangement 100 shown in FIG. 1, and/or with reference to one of the joining devices 105 and one of the member devices 115 described with reference to FIGS. 1, 2A, 2B, 4, 5, and/or 6. In one implementation, the communications management module 210 described with reference to FIGS. 2A and/or 2B, may execute one or more sets of codes to control the functional elements of a joining device 105 to perform the functions described below. In another implementation, the route optimization module 435 described with reference to FIG. 4 may execute one or more sets of codes to control the functional elements of a joining device 105 to perform the functions described below.

In one embodiment, at block 705, the device 105 may join an existing mesh network 110 by authenticating with only one of the plurality of member devices of the existing mesh network. Thus, the device 105 may join the existing mesh network 110, without needing any additional authentication procedures with another member device 115. If the single authentication procedure is successfully completed, at block 710, the device 105 may send a route request message to one or more of the plurality of member devices of the existing mesh network 110. The route request message may be sent during a paging window to ensure that the other member devices 115 are awake and listening on the paging channel for traffic. At block 715, the device 105 may receive one or more route reply messages from one or more of the plurality of member devices 115 of the existing mesh network 110. The route reply messages may be sent during the synchronized paging window time period configured for the mesh network 110.

At block 720, the device 105 may determine a route to one or more provider member devices 115 of the existing mesh network 110 based on the received route reply messages. The device 105 may determine the route based on, for example, the hop count between the device 105 and the provider member device 115, the channel conditions associated with one or more of the hops, network loading, and the like. The determined optimal route may provide a shortest and/or a quickest traffic path between the device 105 and the provider member device 115 to communicate information. Accordingly, the device 105 may determine a route to the one or more provider member devices that is optimal with respect to the current environment of the existing mesh network.

Therefore, the method 700 may be used to simplify peering for a device to join an existing mesh network and, based on the simplified peering, enable the device to quickly learn its neighbors without having to peer with other member devices of the mesh network. As described above, permitting the device to determine the mesh network topology to determine the route, without the messages exchanged for peering with every member device of the existing mesh network, reduces network load and increases access to the services being provided by the provider member device. It should be noted that the method 700 is just one implementation and that other implementations are possible.

Figure 8:
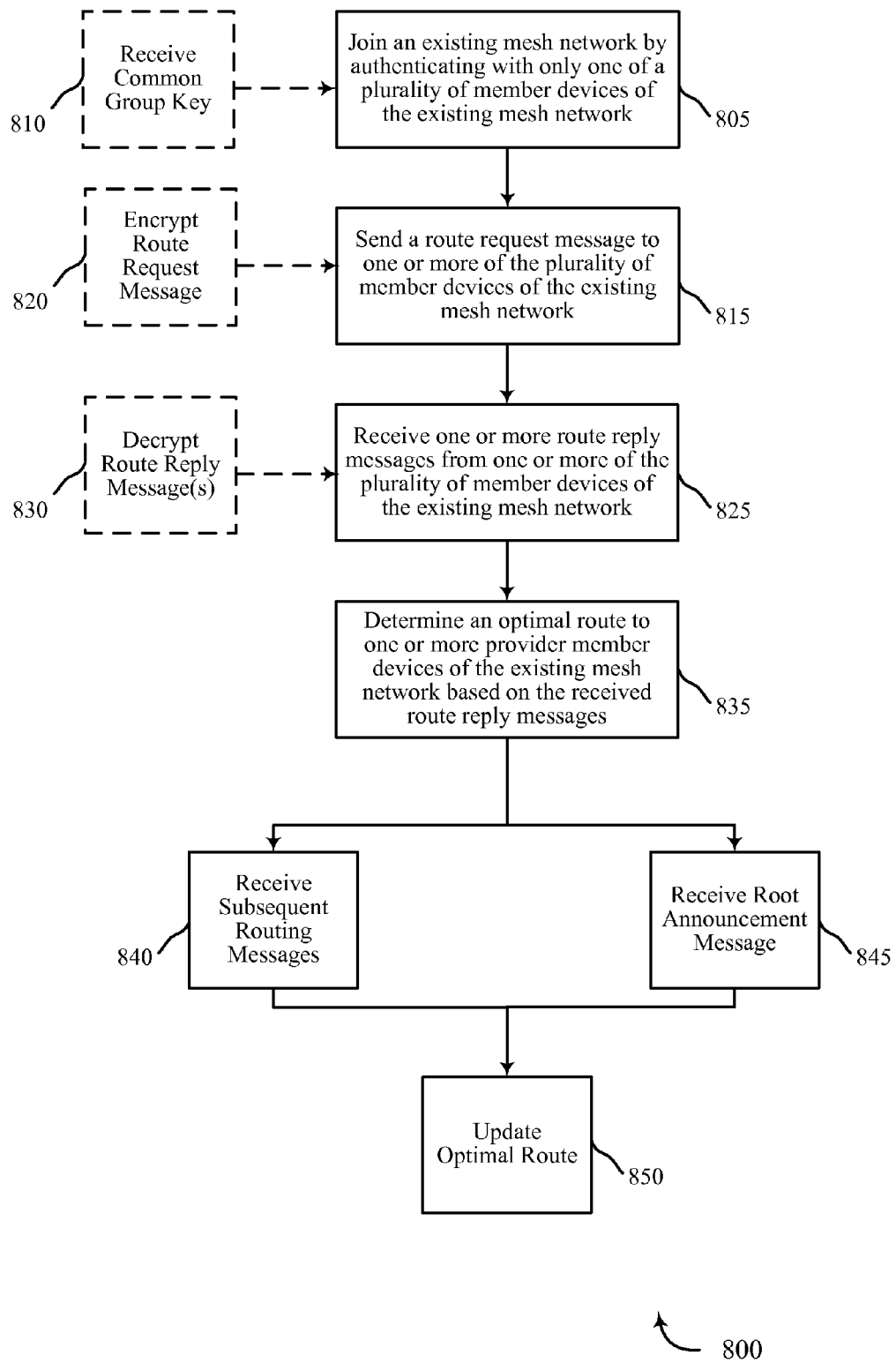
FIG. 8 is a flowchart illustrating a further embodiment of a method for communications via a mesh network.

FIG. 8 is a flowchart illustrating another embodiment of a method 800 performed by a joining device 105 for communications via a mesh network, such as for obtaining one or more services thereby. For clarity, the method 800 is described below with reference to the arrangement 100 shown in FIG. 1, and/or with reference to one of the joining devices 105 and/or one of the member devices 115 described with reference to FIGS. 1, 2A, 2B, 4, 5, and/or 6. In one implementation, the communications management module 210 described with reference to FIGS. 2A and/or 2B may execute one or more sets of codes to control the functional elements of a joining device 105 to perform the functions described below. In one implementation, the route optimization module 435 described with reference to FIG. 4 may execute one or more sets of codes to control the functional elements of a joining device 105 to perform the functions described below.

In one embodiment, at block 805, the device 105 may join an existing mesh network 110 by authenticating with only one of the plurality of member devices of the existing mesh network. Thus, the device 105 may join the existing mesh network 110, without needing any additional authentication procedures with another member device 115 to join the existing mesh network 110. Optionally at block 810, the device 105 may receive a common group key from the member device it peers with once the authentication procedure is complete. The common group key may be shared amongst the participating member devices 115 of the existing mesh network 110.

If the single authentication procedure is successfully completed, at block 815, the device 105 may send a route request message to one or more of the plurality of member devices of the existing mesh network 110. The route request message may be sent during a paging window to ensure that the other member devices 115 are awake and listening on the paging channel for network traffic. The route request message may optionally be encrypted at block 820 using the common group key. At block 825, the device 105 may receive one or more route reply messages from one or more of the plurality of member devices 115 of the existing mesh network 110. The route reply messages may be sent during the synchronized paging window time period configured for the mesh network 110. The route reply messages may optionally be decrypted at block 830 using the common group key. For instance, if the other member device 115 encrypt the route reply messages using the common group key, the device 105 may decrypt the route reply messages at block 830.

At block 835, the device 105 may determine an route to one or more provider member devices 115 of the existing mesh network 110 based on the received route reply messages. The device 105 may determine the route based on, for example, the hop count between the device 105 and the provider member device 115, the channel conditions associated with one or more of the hops, network loading, and the like. The determined route may be an optimal route in that it provides a shortest and/or a quickest traffic path between the device 105 and the provider member device 115 to communicate information.

According to various embodiments, the device 105 may update its information relating to the topology of the existing mesh network 110, e.g., based on member devices 115 joining and/or leaving the mesh network. As such, the device 105 may update its route to the provider member device 115 based on the updated topology information.

At block 845, for instance, a provider member device 115 of the existing mesh network may periodically (e.g., during the paging window 320 discussed above) send a root announcement message to announce its presence and/or the services being provided by the provider member device 115. The root announcement messages may be encrypted with the common group key and, as such, the device 105 may decrypt the root announcement messages using the common group key (not shown). The device 105 may monitor for and receive such root announcement messages at block 845 and use this information to update its route determination at block 850 to a provider member device 115.

At block 840, the device 105 may monitor and/or participate in subsequent route request/route reply message exchanges to update its route determination at block 850. For instance, when a new wireless communication device joins the existing mesh network 110 and sends its route request message, the device 105 may monitor the route reply messages percolating through the mesh network 110 from other member devices 115 to re-discover its neighbors. Accordingly, the device 105 may update its information relating to the topology, hop count, channel conditions, etc., relating to the mesh network 110 and, if necessary, determine a new route to the provider member device 115. As can be appreciated, the device may utilize the processes at blocks 840 and/or 845 to update its information regarding the topology of the existing mesh network 110 but may not change its route to the provider member device 115 when the circumstances indicate such a change is not necessary.

Therefore, the method 800 may be used to simplify peering for a device to join an existing mesh network and, based on the simplified peering, enable the device to quickly learn its neighbors without having to peer with other member devices of the mesh network. As described above, permitting the device to determine the mesh network topology to determine the route, without exchanging messages for peering with every member device of the existing mesh network, reduces network load and increases access to the services being provided by the provider member device. Further, the device may periodically re-discover its neighbor member devices participating in the mesh network to determine if a new route to the provider member device might be optimal. It should be noted that the method 800 is just one implementation and that other implementations are possible.

It should be understood that the methods described above are not mutually exclusive, and may be combined (in part or in whole) with one another as appropriate or desired to achieve a desired implementation.

The foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. The following description uses the terms DTX and discontinuous transmission interchangeably.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for communications via a mesh network, comprising:
    joining, by a joining device, an existing mesh network by authenticating with only one of a plurality of member devices of the existing mesh network;
    receiving, by the joining device, a common group key during the authentication with the only one of the plurality of member devices of the existing mesh network;
    sending, by the joining device, a route request message to one or more of the plurality of member devices of the existing mesh network, including to at least one member device with which the joining device has not authenticated, the route request message being encrypted with the common group key;
    receiving, at the joining device, one or more route reply messages from the one or more of the plurality of member devices of the existing mesh network; and
    determining, at the joining device, a communications route for communicating with one or more provider member devices of the existing mesh network based on the received route reply messages.

2. The method of claim 1, further comprising:
    sending the encrypted route request message to the one or more of the plurality of member devices via the mesh network.

3. The method of claim 1, wherein the one or more route reply messages are encrypted with the common group key.

4. The method of claim 3, further comprising:
    receiving the one or more route reply message via the mesh network; and
    decrypting the received route reply messages using the common group key.

5. The method of claim 4, wherein determining the route further comprises:
    determining a topology of the existing mesh network based on the one or more received route reply messages from the one or more of the plurality of member devices of the existing mesh network; and
    determining the communications route to the one or more provider member devices based on the topology of the existing mesh network.

6. The method of claim 1, further comprising:
    receiving a root announcement message from at least one of the one or more provider member devices.

7. The method of claim 6, wherein the root announcement message is encrypted with the common group key.

8. The method of claim 7, further comprising:
    decrypting the root announcement message using the common group key; and
    determining the communications route to the at least one provider member device based at least in part on the root announcement message.

9. The method of claim 6, wherein the root announcement message is received during a paging window.

10. The method of claim 1, further comprising:
    sending the route request message during a predetermined time interval.

11. The method of claim 10, wherein the predetermined time interval is a paging window configured for the existing mesh network.

12. The method of claim 11, wherein the paging window occurs during a synchronized time interval for the existing mesh network and all of the member devices of the existing mesh network are in an active state during the paging window time interval.

13. The method of claim 1, further comprising:
monitoring for subsequent route request messages and associated route reply messages communicated between member devices of the existing mesh network; and
updating the communications route to the one or more provider member devices of the existing mesh network based on the monitored route reply messages.

14. The method of claim 13, further comprising:
decrypting the communicated subsequent route request messages and associated route reply messages with the common group key.

15. The method of claim 13, wherein updating the communications route further comprises:
determining a topology of the existing mesh network based on the subsequent route reply messages from the member devices of the existing mesh network; and
updating the route to the one or more provider member devices based on the topology.

16. The method of claim 1, wherein determining the communications route comprises determining one or more of a hop count to the one or more provider member devices of the existing mesh network and a channel condition for each hop between the one or more provider member devices and member devices of the existing mesh network.

17. The method of claim 1, wherein the mesh network is a social WiFi mesh network.

18. An apparatus for communications by a wireless communication device via a mesh network, comprising:
a processor module configured to join a joining device to an existing mesh network by authenticating with only one of a plurality of member devices of the existing mesh network; and
a communications management module configured to send a route request message to one or more of the plurality of member devices of the existing mesh network, including to at least one member device with which the joining device has not authenticated, receive one or more route reply messages from the one or more of the plurality of member devices of the existing mesh network, and determine a communications route for communicating with one or more provider member devices of the existing mesh network based on the received route reply messages;
wherein the communications management module is further configured to receive a common group key during the authentication with the only one of the plurality of member devices of the existing mesh network; and
wherein the communications management module is further configured to encrypt the route request message with the common group key.

19. The apparatus of claim 18, wherein the communications management module is further configured to send the encrypted route request message to the one or more of the plurality of member devices via the mesh network.

20. The apparatus of claim 18, wherein the one or more route reply messages are encrypted with the common group key.

21. The apparatus of claim 18, wherein the communications management module is further configured to:
receive the one or more route reply message via the mesh network; and
decrypt the one or more received route reply messages using the common group key.

22. The apparatus of claim 18, wherein the communications management module is further configured to determine the communications route by determining a topology of the existing mesh network based on the one or more received route reply messages from the one or more of the plurality of member devices of the existing mesh network, and determining the communications route to the one or more provider member devices based on the topology.

23. The apparatus of claim 18, wherein the communications management module is further configured to receive a root announcement message from at least one of the one or more provider member devices.

24. The apparatus of claim 23, wherein the root announcement message is encrypted with the common group key.

25. The apparatus of claim 24, wherein the communications management module is further configured to:
decrypt the root announcement message using the common group key; and
determine the communications route to the at least one provider member device based at least in part on the root announcement message.

26. The apparatus of claim 23, wherein the root announcement message is received during a paging window.

27. The apparatus of claim 18, wherein the communications management module is further configured to send the route request message during a predetermined time interval.

28. The apparatus of claim 27, wherein the predetermined time interval is a paging window configured for the existing mesh network.

29. The apparatus of claim 18, wherein the communications management module is further configured to:
monitor for subsequent route request messages and associated route reply messages communicated between member devices of the existing mesh network; and
update the communications route to the one or more provider member devices of the existing mesh network based on the monitored route reply messages.

30. An apparatus for communications by a wireless communication device via a mesh network, comprising:
at least one processor;
a memory in electronic communication with the at least one processor; and
instructions stored in the memory, the instructions being executable by the at least one processor to:
join, by a joining device, an existing mesh network by authenticating with only one of a plurality of member devices of the existing mesh network;
receive, by the joining device, a common group key during the authentication with the only one of the plurality of member devices of the existing mesh network;
send, by the joining device, a route request message to one or more of the plurality of member devices of the existing mesh network, including to at least one member device with which the joining device has not authenticated;
encrypt, by the joining device, the route request message with the common group key;
receive, at the joining device, one or more route reply messages from the one or more of the plurality of member devices of the existing mesh network; and
determine, at the joining device, a communications route for communicating with one or more provider member devices of the existing mesh network based on the received route reply messages.

31. The apparatus of claim 30, wherein the instructions are further executable by the at least one processor to send the encrypted route request message to the one or more of the plurality of member devices via the mesh network.

32. The apparatus of claim 30, wherein the one or more route reply messages are encrypted with the common group key.

33. The apparatus of claim 32, wherein the instructions are further executable by the at least one processor to:
- receive the one or more route reply message via the mesh network; and
- decrypt the one or more received route reply messages using the common group key.

34. The apparatus of claim 30, wherein the instructions are further executable by the at least one processor to determine the communications route by determining a topology of the existing mesh network based on the one or more received route reply messages from the one or more of the plurality of member devices of the existing mesh network, and determine the communications route based on the topology.

35. The apparatus of claim 30, wherein the instructions are further executable by the at least one processor to:
- monitor for subsequent route request messages and associated route reply messages communicated between other member devices of the existing mesh network; and
- update the communications route to the one or more provider member devices of the existing mesh network based on the monitored route reply messages.

* * * * *